(No Model.)
F. DUGGAN.
COMBINED PITCHFORK AND BAND CUTTER.
No. 501,773. Patented July 18, 1893.
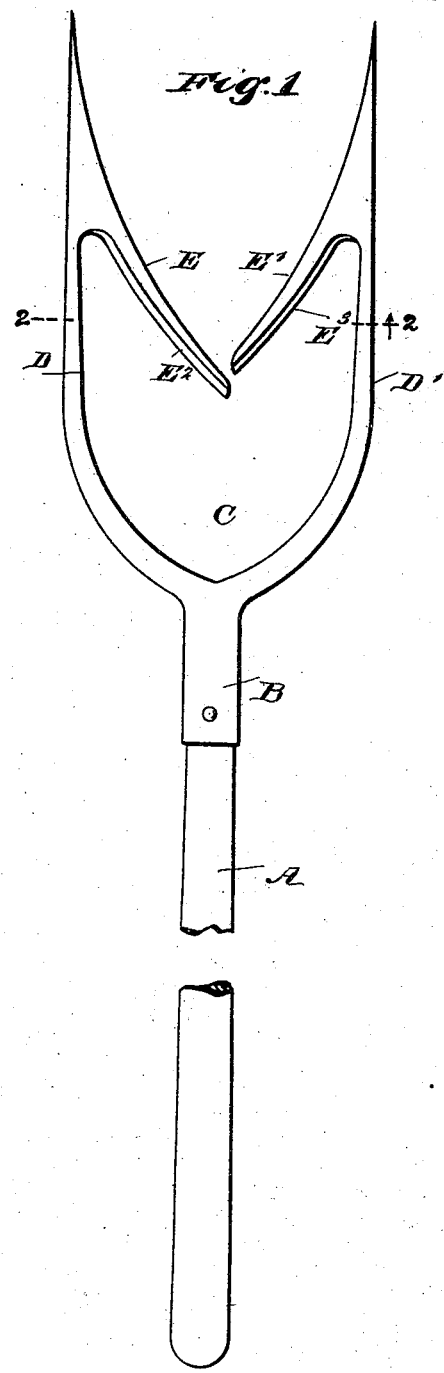
Fig. 1
WITNESSES: 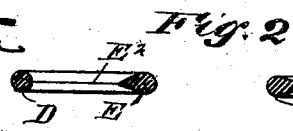 INVENTOR
J. A. Bergstrom   Fig. 2   F. Duggan
C. Sedgwick   BY
   Munn & Co
   ATTORNEYS.

UNITED STATES PATENT OFFICE.

FRANCIS DUGGAN, OF ODESSA, DELAWARE.

COMBINED PITCHFORK AND BAND-CUTTER.

SPECIFICATION forming part of Letters Patent No. 501,773, dated July 18, 1893.

Application filed February 24, 1893. Serial No. 463,598. (No model.)

*To all whom it may concern:*

Be it known that I, FRANCIS DUGGAN, of Odessa, in the county of New Castle and State of Delaware, have invented a new and Improved Combined Pitchfork and Band-Cutter, of which the following is a full, clear, and exact description.

The object of the invention is to provide a new and improved combined pitch-fork and band cutter, for conveniently pitching the sheaf of grain to the feed table of the thrashing or other machine, and to then cut the band on withdrawing the fork.

The invention consists of a fork provided on its prongs with inwardly-extending knives having their cutting edges at the inner edge.

The invention also consists of certain parts and details, and combinations of the same, as will be hereinafter described and then pointed out in the claims.

Reference is to be had to the accompanying drawings forming a part of this specification, in which similar letters of reference indicate corresponding parts in both the figures.

Figure 1 is a plan view of the improvement; and Fig. 2 is a cross section of the same on the line 2—2 of Fig. 1.

The improved implement is provided with a suitable handle A, on one end of which is secured the shank B, of a fork C, provided with the two prongs D and D', extending approximately parallel to each other and formed near their front ends with inwardly-extending knives E, E', respectively, the cutting edges $E^2$ and $E^3$, respectively, of which extend on the inner edge, while the front edge of each knife is smooth to permit a convenient inward passage of the twine band. As shown in Fig. 1, the knives E and E' are curved rearwardly with the points of the knives extending close to one another, to form a passageway for the passage of the band at the time the fork C is pushed into the sheaf of grain. When the operator uses the fork and engages it with the sheaf, then the twine passes through the passageway to the rear of the knives E and E' and after the operator has lifted the sheaf to the feed table of the thrashing or other machine and withdraws the fork, then either of the cutting edges $E^2$ or $E^3$ comes in contact with the band and cuts it. As the inner ends of the knives E and E' stand approximately at right angles to each other, as plainly shown in Fig. 1, the projecting end of the knife E forms a shield or guard for the end of the other knife to prevent the twine from passing through the passageway outward without being cut.

It will be seen that the device is very simple in construction, enables the operator to move the sheaf of grain to the proper position on the feed table, and on withdrawing the fork, cut the band to permit of spreading the grain previous to feeding it to the beating drum of the thrashing machine.

Having thus fully described my invention, I claim as new and desire to secure by Letters Patent—

1. A device of the class described, comprising a fork, and knife blades extending inwardly from the prongs of the said fork, the cutting edges of the knives being at the rear edge thereof, substantially as shown and described.

2. A device of the class described, comprising a handled fork, and knives extending inwardly from the prongs of the said fork, and curved rearwardly to form with their ends a passageway for the twine, the rear edges of the said knives being the cutting edges, while the front edges are smooth, substantially as shown and described.

FRANCIS DUGGAN.

Witnesses:
CORNELIUS W. DAVIS,
J. L. GIBSON.